United States Patent Office 2,891,932
Patented June 23, 1959

2,891,932
ACRYLYL DICYANDIAMIDES AND POLYMERS THEREOF

Elinor M. Hankins, Philadelphia, Pa., assignor to Rohm & Haas Company, Philadelphia, Pa., a corporation of Delaware No Drawing. Application March 21, 1955
Serial No. 495,780

16 Claims. (Cl. 260—80.5)

This invention relates to new chemical compounds and to polymers thereof. It is particularly concerned with monomeric and polymeric acrylyl and methacrylyl dicyandiamides.

It is the primary object of the present invention to provide new compounds which are polymerizable by an addition polymerization mechanism and which contain reactive groups whereby the polymers may be further reacted or condensed to an infusible and insoluble form. Other objects and advantages of the present invention will be apparent from the following description thereof.

The monomers of the present invention may be considered to have the structure of Formula I or of Formula II:

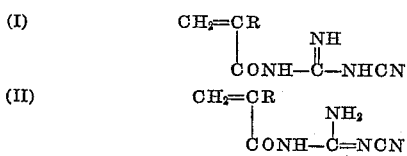

where R is H or $CH_3$.

These compounds may be produced by the reaction of a compound of Formula III:

where R is H or $CH_3$, with dicyandiamide in the presence of an alkali metal or alkaline earth metal hydroxide or oxide. The reaction may be effected at room temperature or somewhat higher temperatures such as up to 50° C., but it is preferably performed below 15° C. and especially at temperatures between —5 to +5° C. The reaction is carried out in the presence of a small amount of water together with an organic solvent miscible therewith so that the solvent medium serves to dissolve both the starting material and the product of the reaction. The small amount of water normally present in the air-dry reagents such as the alkali metal hydroxide is generally adequate to provide the small amount of water that may be present during the reaction. Examples of the organic solvents that may be used include ketones, such as acetone and methyl ethyl ketone, dioxane, acetonitrile, and the dimethyl ether of diethylene glycol. The proportions of the reagents are not critical but generally molar equivalents of the acid chloride, of the dicyandiamide, and of the metal oxide or hydroxide may be used. Frequently it is preferable to have an excess of the alkaline material and of the dicyandiamide. It is believed that a metal salt of the acrylic dicyandiamide is formed in the solution and this is converted by neutralization with an acid such as acetic acid, hydrochloric acid, sulfuric acid or phosphoric acid to the free acid form of the monomeric compound. Neutralization of the alkaline reaction mixture with such an acid causes precipitation of the acrylic dicyandiamide as such. The crystalline product may then be recovered by decantation, filtration, and purified by washing and/or recrystallization as described in the specific examples.

Examples I and II are illustrative of the procedures for making the monomeric compounds:

Example I

A mixture of 53 grams (0.8 mole) of potassium hydroxide pellets, 150 ml. of water, 42 grams (0.5 mole) of dicyandiamide, and 200 ml. of acetone in a 1 liter, three-necked, round-bottomed flask equipped with stirrer, thermometer, and dropping funnel was cooled to 0° C. In two and three-quarter hours 36.2 grams (0.4 mole) of acrylyl chloride was dropped in at 0 to 5° C. The mixture was stirred at 0° C. for one hour. Then 200 ml. of water and 200 ml. of acetic acid were added. After another half hour at ice bath temperature the reaction mixture was filtered to remove 19.8 grams of a white solid. Two recrystallizations from acetone yielded acrylyl dicyandiamide, an almost white, crystalline solid, M.P. 165–167° C. with decomposition.

*Analysis.*—Calculated, percent, for $C_5H_6N_4O$: C, 43.47; H, 4.38; N, 40.56. Found, percent: C, 43.38; H, 4.41; N, 40.15.

Example II

To a solution of 106 grams (1.6 moles) of potassium hydroxide pellets in 150 ml. of water in a 2-liter, three-necked, round-bottomed flask equipped with a stirrer, thermometer, and dropping funnel there was added 84 grams (1 mole) of dicyandiamide and 400 ml. of acetone. The mixture was cooled to 5° C. and 83.7 grams (0.8 mole) of methacrylyl chloride was dropped in at 0–5° C. in one and one-half hours. The reaction mixture was stirred for another half hour and 1 liter of cold water was added. The mixture was acidified to pH 4.5 by addition of 90.5 grams of glacial acetic acid. The precipitated product was removed by filtration and washed with 300 ml. of water. There was obtained 94.3 grams (78%) of methacrylyl dicyandiamide, a white, crystalline solid, M.P. 158.5–160.5° C. Recrystallization from acetone yielded a first crop, 47.2 grams, M.P. 162.5–163.5° C., and a second crop, 12.6 grams, M.P. 161–162° C.

The analytical results were: C, 47.59%; H, 5.42%; N, 36.72%; Cl, <0.06. Calculated, percent, for $C_6H_8N_4O$: C, 47.36; H, 5.30; N, 36.83; Cl, nil.

The monomeric compounds thereby obtained may be polymerized in solution or by the suspension or emulsion systems. In general, from 0.1% to 3% by weight based on the weight of monomers of any free radical initiator, such as diisobutyronitrile, benzoyl peroxide or ammonium persulfate may be employed. In addition, chain transfer agents such as mercaptoethanol in an amount of 0.1 to 4% by weight of the monomers may be used. In solution polymerization such solvents as methanol, ethanol, acetonitrile, dimethylformamide, dimethylacetamide and mixtures of any of these solvents with water may be employed.

In emulsion polymerization of the new monomers, anionic, cationic or non-ionic emulsifiers may be employed or a mixture of two types, such as a mixture of non-ionic and anionic may be used. Examples of anionic emulsifiers that may be employed include sodium lauryl sulfate, the sodium salt of tert-octylbenzenesulfonic acid. Examples of non-ionic emulsifiers include the octylphenoxypolyethoxyethanols having alkyl groups of about seven to eighteen carbon atoms and from six to sixty or more oxyethylene oxide units. Examples of cationic agents include octylbenzyl trimethylamine chloride and dodecyl trimethylammonium chloride. The temperature of polymerization may be between 0 and 100° C., preferably from about 30° to 60° C.

The monomers of the present invention may be copolymerized with one or more other monoethylenically unsaturated compounds to produce binary, ternary, etc. copolymers. Examples of other monomers that may be copolymerized include the esters of acrylic acid or of methacrylic acid or of the dimer of methacrylic acid with monohydric alcohols such as methyl, ethyl, butyl, octyl, dodecyl, cyclohexyl, cyanoethyl, benzyl, phenylethyl, and the like; diesters of itaconic acid and the above alcohols; esters of maleic, fumaric, or citraconic acids with the above alcohols; vinyl esters of carboxylic acids such as acetic, propionic, butyric and the like; vinyloxyalkyl esters such as vinyloxyethyl acetate, etc.; vinyl ethers and sulfides such as ethyl vinyl ether or ethyl vinyl sulfide, butyl vinyl ether, octyl vinyl ether; methacrylonitrile or acrylonitrile; acrylamide, or methacrylamide, and N-alkyl-substituted amides of these types; vinyl toluene, vinyl naphthalenes, such as 4-chloro-1-vinyl naphthalene, and styrene.

The monomeric compounds are solids which are stable under normal storage conditions but, as pointed out, may readily be polymerized to form linear soluble types of polymers with or without additional comonomers. The polymers obtained are solid synthetic resins which may have various solubilities but which are adapted to react upon heating to elevated temperatures, such as those temperatures of 110° to 250° C. to form cross-linked polymers. Auxiliary cross-linking agents may also be included to react with the dicyandiamide groups of the polymer. Examples of such auxiliary cross-linking agents include aldehydes, such as formaldehyde, glyoxal, acetaldehyde, revertible polymers of formaldehyde, and also resin-forming heat-convertible preliminary condensation products of such aldehydes, and especially of formaldehyde, with urea, thiourea, triazines, such as melamine and the like. The polymer may also be reacted with hydrogen sulfide to convert the acrylyl or methacrylyl dicyandiamide groups therein to acrylyl or methacrylyl guanyl thiourea groups having the Formula IV:

(IV)

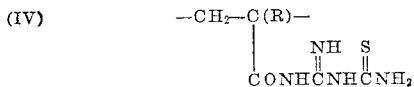

Thus, the polymers of the present invention and especially the copolymers are adapted to serve as starting materials or intermediates for the production of a wide variety of new polymeric compounds.

The polymers of the present invention, by which it is intended to include both homopolymers and copolymers, may be employed to form films, fibers, molded masses and coatings. They are useful for the coating or impregnation of paptr, textiles, leather and the like. For example, they are useful for the modification of paper pulps to impart increased wet strength to the paper sheets formed thereof. For this purpose, the preferred polymers are copolymers containing from 3% to 50% by weight of acrylyl or methacrylyl dicyandiamide with other comonomers, such as with an acrylic ester of which ethyl acrylate or butyl acrylate are representative. Solutions of copolymers may be applied to various textile materials for stiffening, crease-proofing, or crush-proofiing them. For example, they may be applied to cotton, rayon or other fabrics in an amount of from 2% to 10% by weight on the weight of the fabric. For this purpose, copolymers having 3% to 30% by weight of the dicyandiamide units with such comonomers as acrylic esters, such as ethyl or butyl acrylates are particularly valuable. Optionally, the polymers of the present invention may be applied for this purpose in conjunction with known materials heretofore used, such as one of the aminoplast condensates including specifically urea-formaldehyde or melamine-formaldehyde condensates. They may also be applied to wool fabrics for the purpose of reducing shrinkage thereof. Generally the application of 5% to 15% on the weight of the wool of a copolymer containing from 5% to 15% by weight of dicyandiamide units with 85% to 95% by weight of acrylic esters, such as butyl acrylate, may be applied for this purpose. The copolymers are also valuable as coatings for leather since they have been found to show improved adhesion to the leather as compared to simple polymeric acrylates. In all the applications mentioned for paper, textiles and the coating of leather, the paper or fabric impregnated or coated with the polymers is dried and then preferably subjected to a baking or curing operation at elevated temperatures, such as from 110° to 200° C. The time of curing may vary from a few minutes at temperatures of the order of 200° C. or higher to about an hour at the lower temperatures. The following examples are illustrative of the preparation of polymers and their application for various purposes:

*Example III*

A mixture of 10 grams of methacrylyl dicyandiamide, 20 grams of dimethylformamide, 0.25 gram of mercaptoethanol, and 0.2 gram of dimethyl azodiisobutyrate was heated in a pop bottle under nitrogen for seventeen hours at 65° C. Addition of acetone to the viscous polymerization mixture precipitated the polymer which was removed by filtration and washed with acetone. The dried polymer weighed 10.1 grams and was soluble in 50% aqueous formic acid.

*Analysis.*—Calculated, percent, for $C_6H_8N_4O$: H, 5.30; N, 36.83; C, 47.36. Found, percent: C, 47.1; H, 6.4; N, 31.9.

A polymer is similarly obtained when the methacrylyl dicyandiamide is replaced wtih acrylyl dicyandiamide.

*Example IV*

A mixture of 9.37 grams of N-(β-methacrylamidoethyl)-N,N'-ethyleneurea, 0.38 gram of methacrylyl dicyandiamide, 9.75 grams of water, 9.75 grams of dimethylformamide, 0.3 gram of mercaptoethanol, and 0.1 gram of dimethyl azodiisobutyrate was heated in a pop bottle under nitrogen for seventeen hours at 65° C. The Gardner-Holdt viscosity of the resulting solution was P. The reaction mixture was added to 800 ml. of acetone to precipitate the polymer. After removal of the acetone layer, the residue was dissolved in water, reprecipitated with acetone, and dried for one day at 60° C. and 0.5 mm. to give 7.6 grams of a white, brittle hygroscopic solid.

*Example V*

A solution of 3.90 grams of the copolymer obtained in Example IV in 7.80 grams of water (Gardner-Holdt viscosity=T+) was added slowly at pH 8.5 to a solution of 8.13 grams (0.10 mole) of 36.5% aqueous formaldehyde in 20 grams of water. The resulting solution was heated at 65° C. for two hours. When this resin was added to unbleached kraft pulp at pH 4.5 in an amount of 0.5% on the weight of dry pulp, the paper sheets obtained therefrom had a wet tensile strength of 12.1 lbs./in. after twenty-eight days. The same pulp with 2% of a commercial urea-formaldehyde resin added produced sheets having a wet tensile strength of only 8.4 lbs./in.

*Example VI*

A solution of 7.61 grams (0.05 mole of methacrylyl dicyandiamide, 153.4 grams of n-butanol, 95 grams (0.95 mole) of methyl methacrylate, and 2 grams of azodiisobutyronitrile was added in two and one-half hours at 83±2° C. with stirring, under nitrogen, to a 500 ml. four-necked, round-bottomed flask equipped with stirrer, condenser, thermometer, and dropping funnel. The mixture was recatalyzed with an additional 0.06 gram of azodiisobutyronitrile and heated another two hours at 83±2° C. An additional 0.06 gram of azonitrile was then added. After one more hour at 83±2° C., 50 ml. of ethoxyethyl acetate and 50 ml. of xylene were added. Some solvent was removed by distillation at reduced pressure; more xylene was added during the stripping. There was obtained 312.6 grams of an almost colorless liquid solution of a copolymer of approximately 95 mole percent of methyl methacrylate and about 5 mole percent of methacrylyl dicyandiamide (Gardner-Holdt viscosity=Z-1 at 33.7% solids). The color on the Paint-Varnish scale was 1.

Example VII

A solution of 7.61 grams (0.05 mole) of methacrylyl dicyandiamide, 140 grams of absolute ethyl alcohol, 52.3 grams (0.5225 mole) of methyl methacrylate, 54.8 grams (0.427 mole) of butyl acrylate, and 1.72 grams of azodiisobutyronitrile was added in three and three-quarter hours at 82±2° under nitrogen to a 500 ml. four-necked, round-bottomed flask equipped with stirrer, condenser, thermometer, and dropping funnel. The mixture was recatalyzed with 0.06 gram azonitrile and heated two hours at 82±2°. Then 0.06 gram more azodiisobutyronitrile was added. After one hour at 82±2°, 100 ml. of xylene was added.

The polymerization mixture was stripped at reduced pressure and with addition of 200 ml. more xylene. There was obtained 286.7 grams of a very viscous (>Z-7), almost colorless solution, 274.7 grams of which was diluted to 388.5 grams by addition of xylene. The final solution had a Gardner-Holdt viscosity of Z-5+ at 30.6% solids. The Paint-Varnish scale color was 1.

Example VIII (a) Butyl phosphoric acid (monobutyl phosphate in an amount of 1% based on resin solids) was added to a portion of the copolymer solution of Example VI. The resulting mixture was cast on a glass plate and baked at 150° C. for one hour. The film had a pencil hardness of 7H and was transparent. The film obtained showed reduced solubility in ethoxyethyl acetate as compared to a homopolymer of methyl methacrylate.

(b) To a portion of the copolymer solution of Example VI, there was added 20% (on the weight of copolymer) of bis-methoxymethyl-N,N'-ethyleneurea and 0.5% (on total weight of copolymer and urea derivative) of p-toluenesulfonic acid. The film was cast on a glass plate and baked one-half hour at 200° C. The film was transparent and coherent, had a pencil hardness of 7H, and had good adhesion to the glass. The film was unaffected when subjected to ethoxyethyl acetate for 24 hours.

Example IX (a) To a portion of the solution of copolymer obtained in Example VII, there was added 2% of monobutyl phosphate (on the weight of copolymer). The solution was then cast on a glass plate and baked one-half hour at 200° C. A colorless transparent coherent film was obtained having a pencil hardness of H. It exhibited good adhesion to the glass and showed improved resistance to ethoxyethyl acetate as compared to corresponding copolymers containing no methacrylyl dicyandiamide.

(b) When 20% of the bis-methoxymethyl-N,N'-ethyleneurea is added with 1% of the monobutyl phosphate to the copolymer solution of Example VII, and the film cast on glass is heated to 150° C. for one-half hour, the resulting film remained unaffected when subjected to ethoxyethyl acetate for 24 hours.

Example X

A copolymer of approximately 95 mole percent of methyl methacrylate and 5 mole percent of acrylyl dicyandiamide is obtained by the procedure of Example 6.

Example XI (a) A dispersion of a copolymer was prepared by emulsifying 97 parts by weight of ethyl acrylate with 3 parts by weight of acrylyl dicyandiamide in about 300 parts by weight of water with about 2 parts by weight of sodium lauryl sulfate and 6 parts by weight of an ethylene oxide condensation product of an octyl phenol containing between 30 and 50 oxyethylene units per molecule. To the emulsified monomers 0.3% by weight of ammonium persulfate, 0.06% of sodium hydrosulfite, and 1% triethanolamine were added to catalyze the copolymerization which was carried out for a period of about fifteen minutes during which the temperature rose from 20° C. to 45° C.

(b) Nine parts of red iron oxide are dispersed in 14 parts of water by means of two parts of a suitable dispersing agent, such as a mixture of equal parts of sodium lauryl sulfate and t-octylphenoxypolyethoxyethanol containing about 10 oxyethylene units in combination with ½ part of a suitable protective colloid, such as methyl cellulose, and the mixture was added to 100 parts of the copolymer dispersion of part (a) hereof. The resulting pigmented dispersion was swabbed on several pieces of a full grain upholstery leather and dried at 50° C. The coating exhibited excellent adhesion to the leather.

It is to be understood that changes and variations may be made without departing from the spirit and scope of the invention as defined in the appended claims.

I claim:
1. A compound selected from the group consisting of acrylyl dicyandiamide and methacrylyl dicyandiamide in which the acrylyl group has the formula

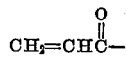

and the methacrylyl group has the formula

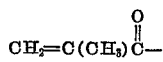

2. An addition polymer of a compound of claim 1.
3. Acrylyl dicyandiamide in which the acrylyl group has the formula

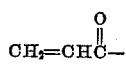

4. An addition polymer of the compound of claim 3.
5. An addition copolymer of the compound of claim 3 with at least one other copolymerizable monoethylenically unsaturated compound.
6. An addition copolymer of the compound of claim 3 with methyl methacrylate.
7. An addition copolymer of the compound of claim 3 with ethyl acrylate.
8. An addition copolymer of 5 mole percent of the compound of claim 3 with 95 mole percent of methyl methacrylate.
9. An addition copolymer of about 3 mole percent of the compound of claim 3 with about 97 mole percent of ethyl acrylate.
10. Methacrylyl dicyandiamide in which the methacrylyl group has the formula

11. An addition polymer of the compound of claim 10.
12. An addition copolymer of the compound of claim 10 with at least one other copolymerizable monoethylenically unsaturated compound.
13. An addition copolymer of the compound of claim 10 with methyl methacrylate.
14. An addition copolymer of the compound of claim 10 with methyl methacrylate and butyl acrylate.
15. An addition copolymer of 5 mole percent of the compound of claim 10 with 95 mole percent of methyl methacrylate.
16. An addition copolymer of about 52 mole percent of methyl methacrylate, about 43 mole percent of butyl acrylate, and about 5 mole percent of the compound of claim 10.

References Cited in the file of this patent

UNITED STATES PATENTS

| | | |
|---|---|---|
| 2,407,161 | Kaiser et al. | Sept. 3, 1946 |
| 2,469,696 | Minsk et al. | May 10, 1949 |
| 2,483,969 | Gajewski | Oct. 4, 1949 |

FOREIGN PATENTS

| | | |
|---|---|---|
| 546,027 | Great Britain | June 24, 1942 |